Figure 4:
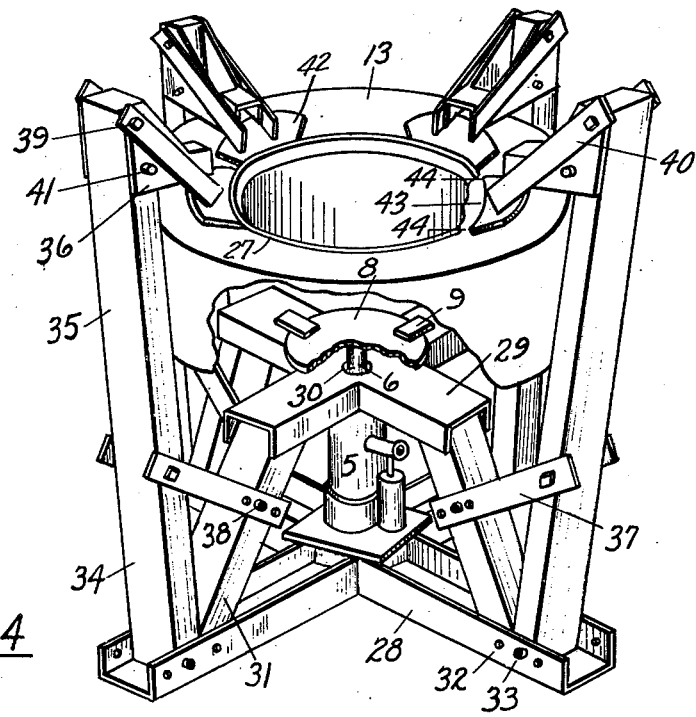

Dec. 10, 1957 W. E. BOCHERT 2,815,803
CIRCUMFERENTIALLY DISTRIBUTED THRUST
TYPE TIRE REMOVING DEVICE
Filed May 11, 1954 2 Sheets-Sheet 1
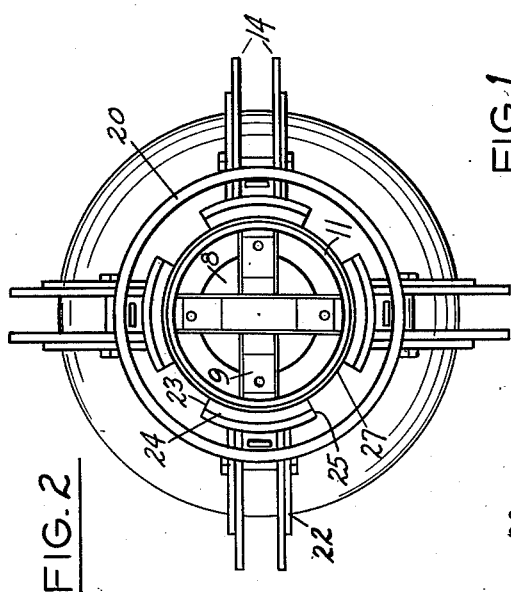
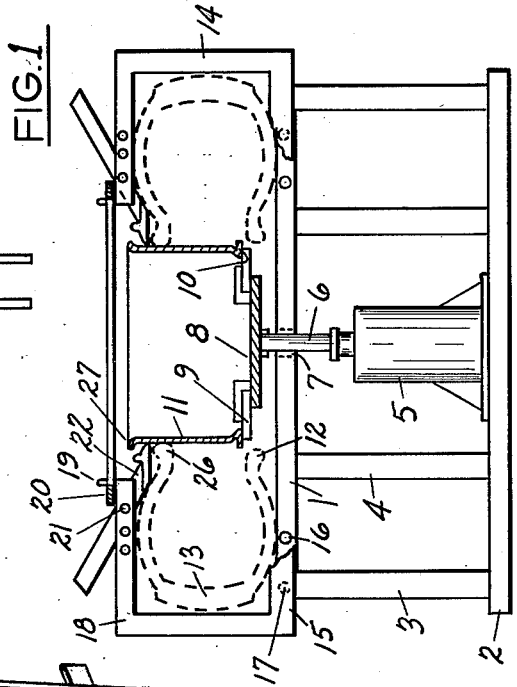
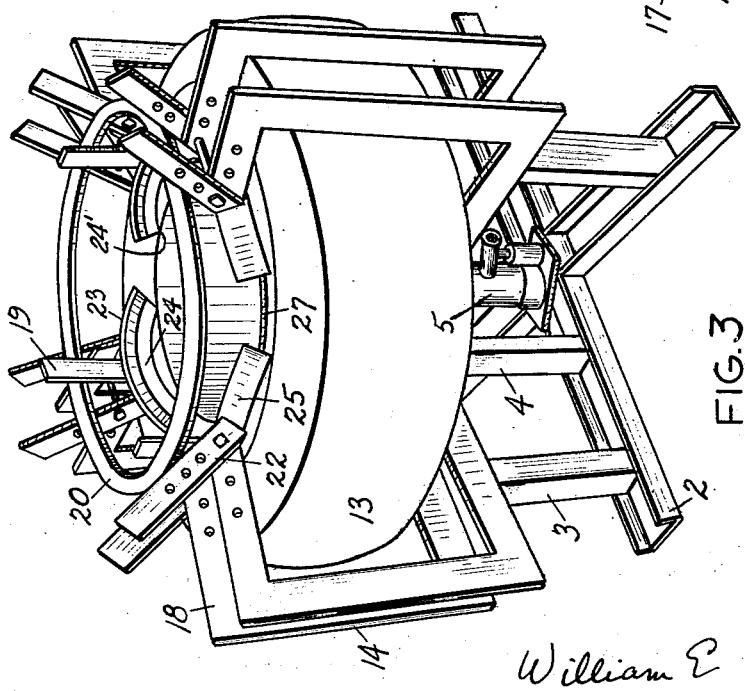
INVENTOR
William E. Bochert
BY Ralph Hamma
ATTORNEY INVENTOR.
William E. Bochert
BY
Ralph Hammar
attorney

2,815,803
CIRCUMFERENTIALLY DISTRIBUTED THRUST TYPE TIRE REMOVING DEVICE

William E. Bochert, Cranesville, Pa.

Application May 11, 1954, Serial No. 429,045

2 Claims. (Cl. 157—1.2)

This invention is a tire removing device especially useful for heavy truck tires which frequently have beads stuck to rims. In the device, the rim is forced out of the tire by a jack while the tire is held by circumferentially spaced hooks each carrying a pivoted bead breaker having an arcuate shoe which initially is forced between the wheel rim and tire tread by a toggle action to break the bead loose and then engages the circumference of the bead adjacent the rim and prevents the bead from being rolled up while the rim is being pushed out of the tire.

In the drawings, Fig. 1 is a sectional side elevation, Fig. 2 is a top plan view, Fig. 3 is a perspective showing the position of the parts at the start of the tire removing operation, and Fig. 4 is a perspective of a modification.

Referring to the drawings, the base of the tire removing device conveniently comprises upper and lower crossed members 1 and 2 which are conveniently made of welded channel iron. At the outer ends, the members are connected by welded uprights 3 and additional uprights 4 may be provided to stiffen the base. At the center of the lower base member 2 is a seat for a jack 5 having its thrust exerting member 6 extending up through an opening 7 in the top member 1 and carrying on its projecting end a rim seat member 8 having adjustable shoes 9 which are movable radially to accommodate different rim diameters. The rim seat member 8 may likewise be made of welded crossed channel members. When used with demountable rims, the shoes 9 are adjusted so as to contact the lower edge 10 of a rim 11 but to be clear of a bead 12 of a tire 13 mounted on the rim. The shoes are not necessary for disk wheels where the rim is integral with the wheel. By operating the jack 5, the rim seat member 8 with the rim 11 mounted thereon is forced upward. The tire is held on the base so that the rim can be forced out of the tire by the jack by a plurality of C-shaped hook members 14 having lower arms 15 pivoted on pins 16 in the arms of the upper base member 1. A plurality of holes 17 are provided for the pivot pins 16 to accommodate varying tire sizes. The upper arms 18 of the hook members 14 extend over the tire 13 and at their inner ends have upstanding projections 19 encircled by a ring 20 of proper size for the tire being removed which holds the hook members in place over the tire. The ring 20 is removable and is put in place around the projections after the hold-down hook members 14 have been pivoted into position over the tire. Adjacent the inner ends of the arms 18 of the hook members are pivots 21 for levers 22 which normally incline downward from the arms 18 and at their lower ends are fixed to the center of arcuate bead breaking shoes 23. The shoes 23 have inner edges 24 which conform generally to the outer surface of the rim and have upstanding flanges 25 outside of the rim. Initially the corners of the shoes engage the tire at the junction of the rim flange and tire and the centers of the shoes curve upward away from the tire. As the jack 5 moves the rim 11 upward, the tire which initially has its bead stuck to the rim exerts a corresponding upward force localized on the corners of the shoes which depresses the parts of the tire beneath the corners relative to the rim. An upward force exerted on the shoes 23 tends to bring the shoes into line with the pivots and causes the inner edge 24 of the shoes to be forced between the bead 26 of the tire and the adjacent flange 27 on the rim with a toggle action which effectively pries the bead loose from the rim so that the rim can readily be forced out of the tire by the jack 5. The prying action for breaking the bead from the rim starts locally at the corners and works progressively inward with continued locally applied pressure toward the centers of the shoes as the levers 22 are pivoted upward. This inherently gives the advantage of localized pressure for starting the prying of the bead and yet does not continue the localized pressure throughout the tire removal which might damage the tire. When the shoes reach their final position between the tire bead and the rim, the shoes occupy a major portion of the circumference of the bead 26 of this tire so all parts of the beads are effectively supported while the rim is being forced out of the tire.

In the use of the tire removing device the tire rim with the locking ring removed is mounted on the rim seat device after suitable adjustments have been made for the shoes 9 and the hook members 14 are pivoted over the tire 13 and are held in the proper hold-down position by the ring 20 encircling the projections 19. In this position, the extreme ends or corners 24 of the shoes 23 will be adjacent the junction of the side wall of the tire and the outer edge of the rim flange 27. As the jack 5 is operated to move the rim seat member 8 upward the force exerted on the shoes 23 forces the inner edges 24 of the shoes between the bead 26 and the rim flange 27 with a toggle action which pries the bead loose from the rim. Thereafter, the rim 11 is easily forced out of the tire by the jack. The inner edges of the shoes 24 conform to the cylindrical surface of the rim and to the underlying tire bead and prevent the tire bead from being rolled up as the rim is being pushed out of the tire. The same technique described above can be used for breaking the other tire bead away from the locking ring prior to the actual removal of the tire from the rim. For removal of the locking ring, the rim is of course mounted with the locking ring uppermost.

In the tire removing device shown in Fig. 4, there is a spider-shaped base 28 at the center of which is the jack 5. Above the base 28 is another spider 29 having an opening 30 through which the pressure exerting member 6 of the jack projects. On the projecting end of the pressure exerting member 6 is the rim seat member 8 which has been previously described in connection with Figs. 1 to 3, inclusive. The spiders 28 and 29 are connected by angularly extending braces 31 which connect the spiders in a rigid structure. The spider 28 is provided with a series of holes 32 receiving pins 33 which extend through the lower ends of hold-down members 34. By having a series of holes 32, the hold-down members 34 can be moved inward or outward relative to the center of the spider 28 so as to accommodate tires of different diameter. The hold-down members 34 have vertical portions 35 which extend up around the outside of the tire tread. At the upper ends the hold-down members have inwardly extending hook members 36 which extend inward over the tire. The hold-down members are held in position by links 37 connected between the vertical portions 35 of the hold-down members and the braces 31. The links have a series of holes 38 which accommodate the various adjusted positions of the hold-down members. When the links 37 are connected, the hold-down members are solidly positioned around the tire. At the upper ends of the hold-down members 34 are pivots 39 for levers 40 which normally incline downward below the hook members 36 to a position limited by a stop 41. The lower ends of the levers 40 are fixed to arcuate bead breakers 42 having arcuate inner edges 43 which conform generally to the outer surface of the rim. The bead breaking shoes 42 occupy the major portion of the circumference of the tire bead. Before any upward pressure is exerted by the jack 5, the corners 44 of the bead breakers engage the tire adjacent the flange 27 on the room. As upward pressure is exerted by the jack, the bead breakers are pivoted about the pivots 39 and are forced between the tire bead and the flange 27 on the rim with a toggle action which effectively pries the bead loose from the rim. Because the bead breakers enter between the tire bead and the flange 27 of the rim initially at the corners 44, the bead breakers are more easily inserted between the tire and the bead of the rim. When the bead breakers 42 are in place between the tire and the bead 27 of the rim, the greater part of the circumference of the tire bead contacts the bead breakers and prevents the tire bead from being rolled up as the rim is being pushed out of the tire. The hook members 36 limit the upward movement of the bead breakers so that when the bead is broken loose from the rim, the bead breakers are in effect solid with the hook members 36.

What is claimed as new is:

1. In a tire removing device, a base, a jack on the base, a rim seat member on and movable upward by the jack on which a rim with a tire mounted thereon may be placed, circumferentially spaced hook members pivoted on the base below the rim seat member and having hooks extending radially inward over the tire, upstanding projections on the hooks, a removable ring encircling the projections and holding the hooks in place so the rim can be forced out of the tire by the jack, bead breakers on the hooks, each comprising an arcuate shoe below the hooks and having its inner edge conforming generally to the tire bead, a lever having one end fixed to the shoe intermediate the ends of the shoe, said lever being pivoted in the hook radially outward of the curvature of the rim flange and inclined downward toward the rim seat member whereby when the shoe is rested on the tire adjacent the rim, the corners of the shoes initially contact the side wall of the tire at the junction of the tire and the outer edge of the rim flange and an upward force on the shoe forces the shoe between the rim and bead with a toggle action progressively from the corners of the shoe toward the center of the shoe, and an upstanding arcuate flange on the shoe outside the rim.

2. In a tire removing device, a base, a jack on the base, a rim seat member on and movable upward by the jack on which a rim with a tire mounted thereon may be placed, circumferentially spaced hook members pivoted on the base below the rim seat member and extending up around the tread of the tire and at the upper ends having hooks extending radially inward over the side walls of the tire, means holding the hook members in position with the hooks over the side walls of the tire so the rim can be forced out of the tire by the jack, bead breakers on the hooks, each comprising an arcuate shoe below the hooks and having its inner edge conforming generally to the curvature of the rim flange, and a lever having one end fixed to the shoe intermediate the ends of the shoe, said lever being pivoted on the hook radially outward of the tire bead and inclined downward the rim seat member whereby when the shoe is rested on the tire adjacent the rim, the corners of the shoes initially contact the tire and an upward force on the shoe forces the shoe between the rim and bead with a toggle action progressively from the corners of the shoe toward the center of the shoe.

References Cited in the file of this patent

UNITED STATES PATENTS

| | | |
|---|---|---|
| 1,564,496 | Staugard | Dec. 8, 1925 |
| 2,362,061 | Ewing | Nov. 7, 1944 |
| 2,375,956 | Smith et al. | May 15, 1945 |
| 2,401,118 | Talley et al. | May 28, 1946 |
| 2,500,285 | Horton et al. | Mar. 14, 1950 |
| 2,536,139 | Ritter | Jan. 2, 1951 |
| 2,545,157 | McCrary | Mar. 13, 1951 |
| 2,647,564 | Douglass | Aug. 4, 1953 |

FOREIGN PATENTS

| | | |
|---|---|---|
| 575,558 | Great Britain | Feb. 22, 1946 |